March 29, 1966   D. M. INGHRAM ETAL   3,243,123
SPRAYING APPARATUS
Filed Feb. 21, 1963   6 Sheets-Sheet 1
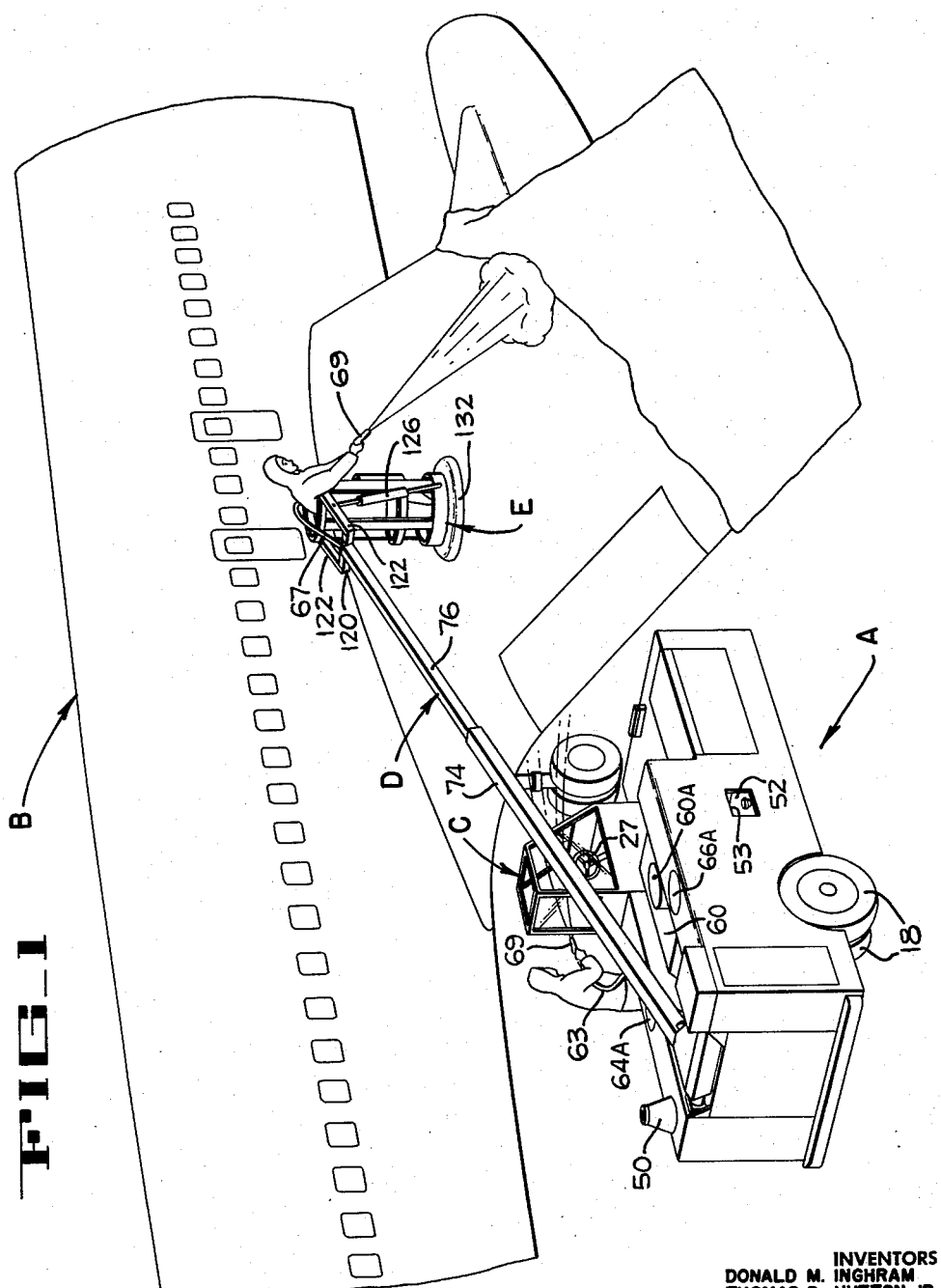
INVENTORS
DONALD M. INGHRAM
THOMAS D. HUTTON, JR.
HAROLD S. OLSON
BY Hans G. Hoffmeister
ATTORNEY

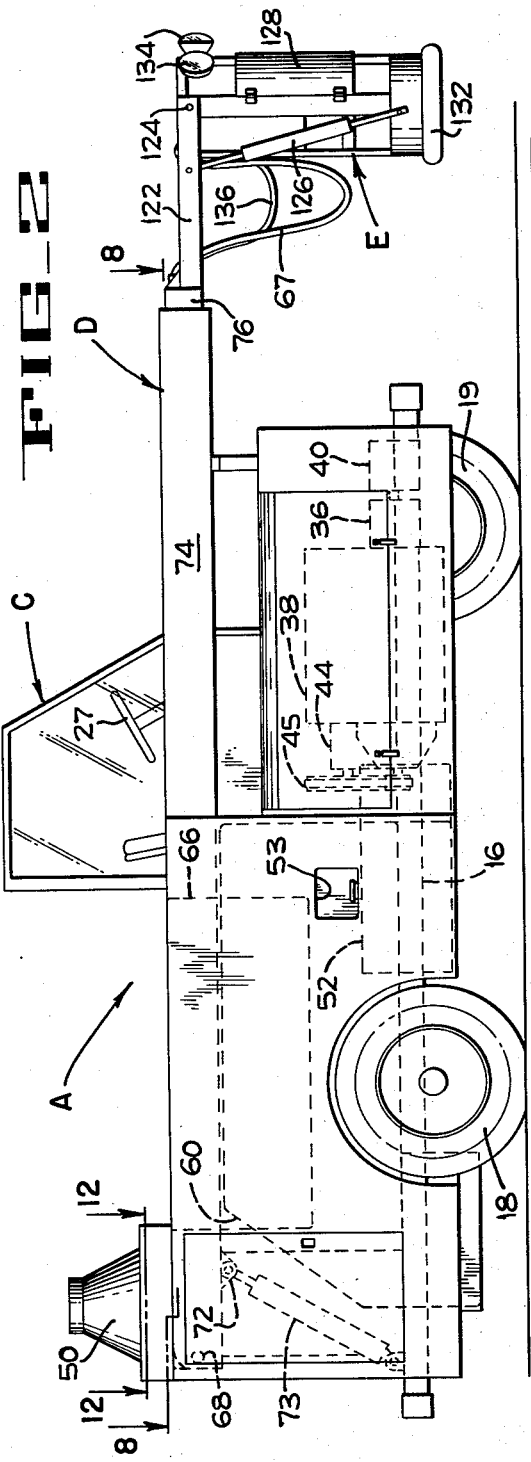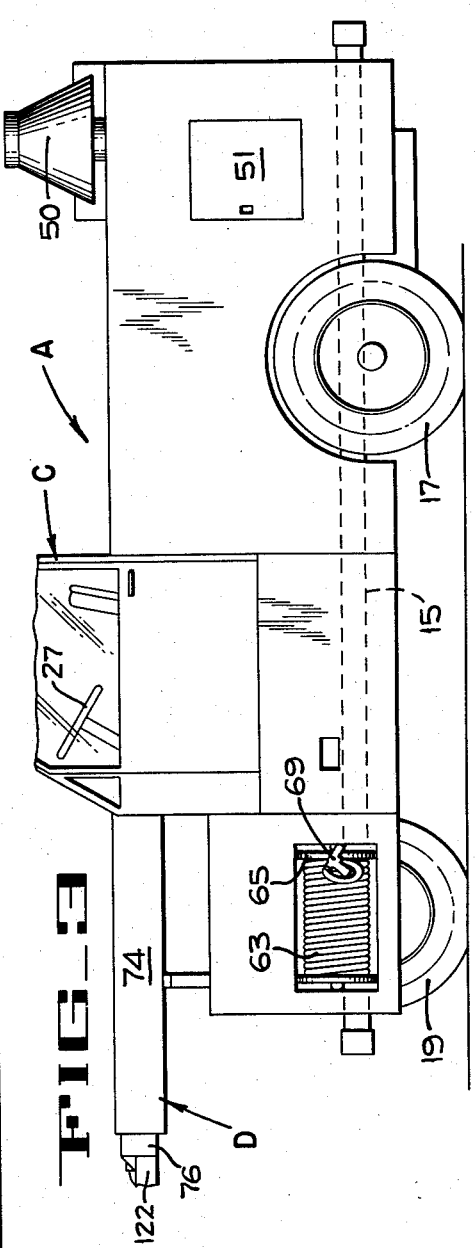

March 29, 1966 D. M. INGHRAM ETAL 3,243,123
SPRAYING APPARATUS
Filed Feb. 21, 1963 6 Sheets-Sheet 3
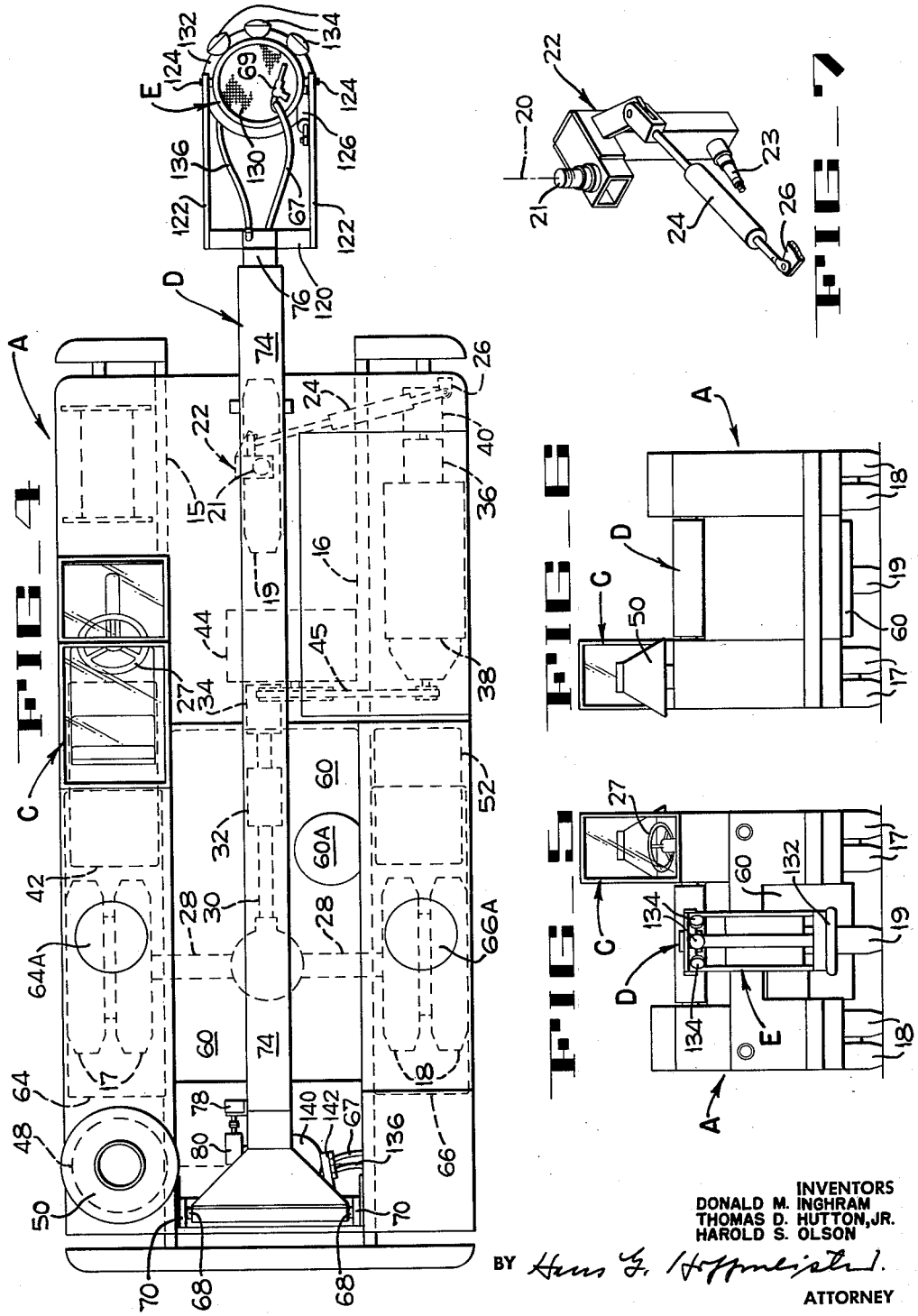
INVENTORS
DONALD M. INGHRAM
THOMAS D. HUTTON, JR.
HAROLD S. OLSON
BY Hans F. Hoffmeister
ATTORNEY

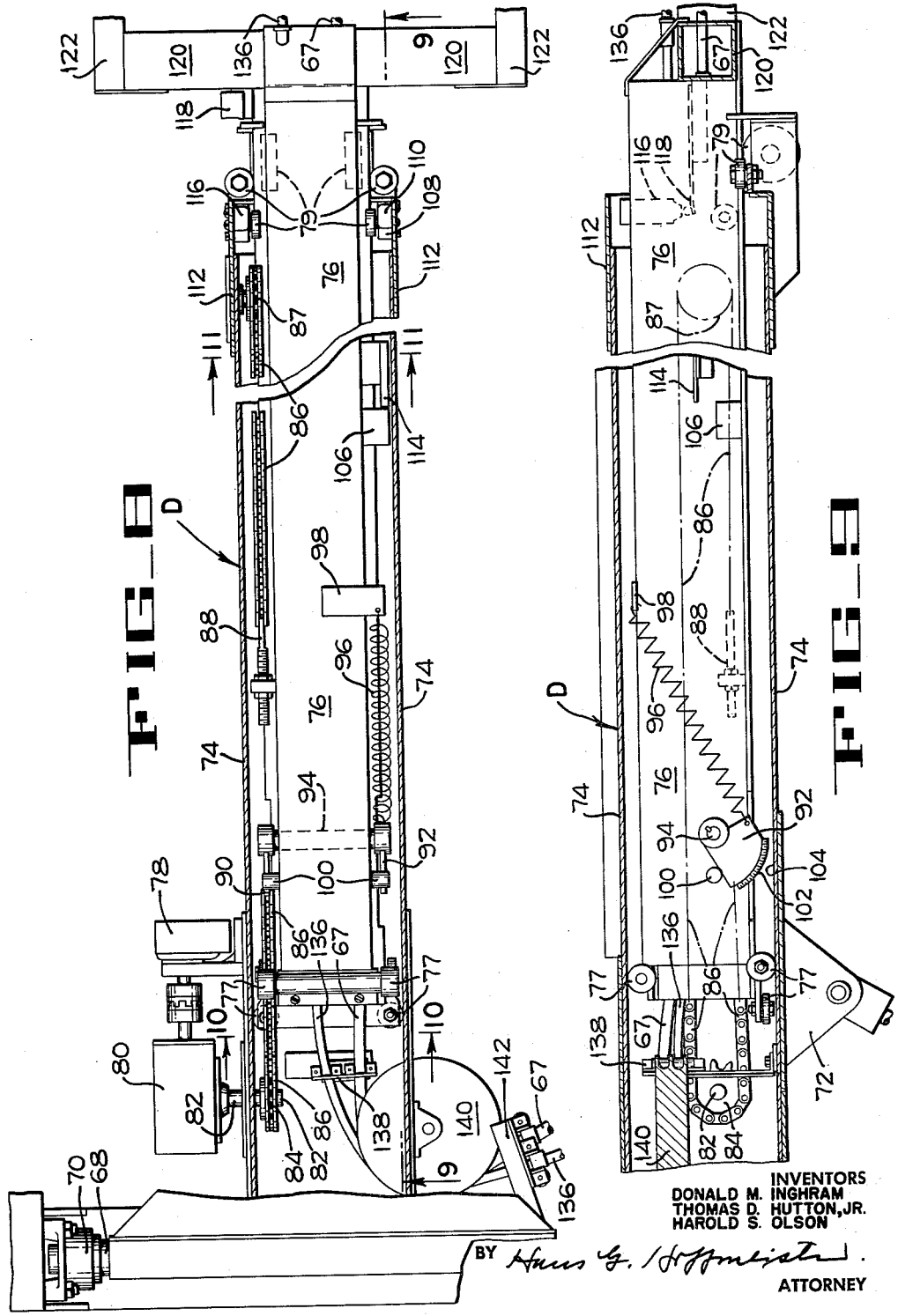

March 29, 1966 D. M. INGHRAM ETAL 3,243,123
SPRAYING APPARATUS
Filed Feb. 21, 1963 6 Sheets-Sheet 5
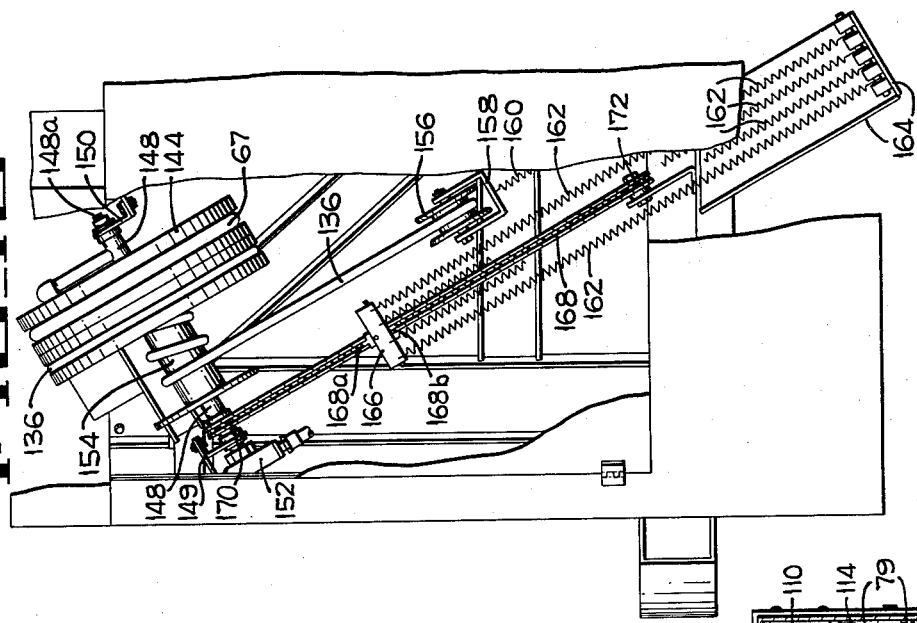
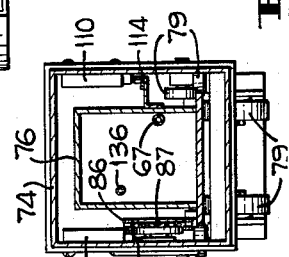
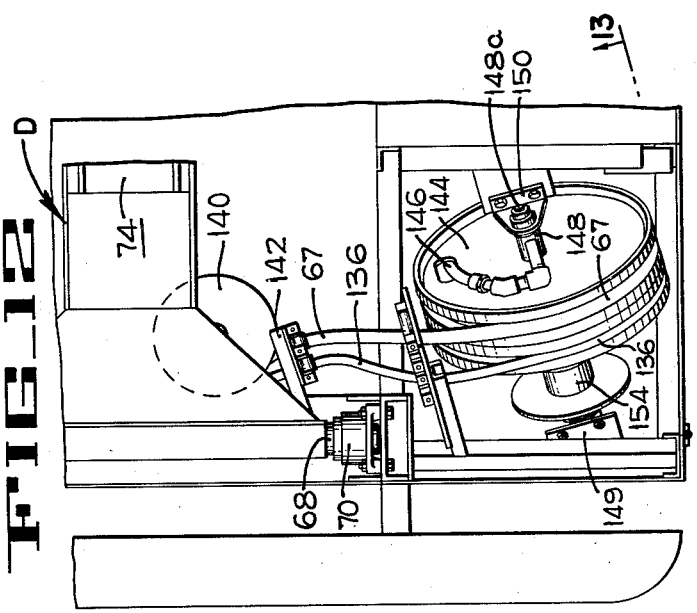
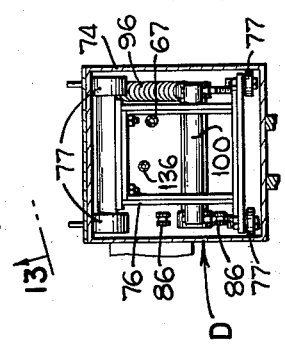
INVENTORS
DONALD M. INGHRAM
THOMAS D. HUTTON, JR.
HAROLD S. OLSON
BY Hans G. Hoffmeister
ATTORNEY March 29, 1966

D. M. INGHRAM ETAL 3,243,123

SPRAYING APPARATUS

Filed Feb. 21, 1963

FIG_14

INVENTORS
DONALD M. INGHRAM
THOMAS D. HUTTON, JR.
HAROLD S. OLSON

BY Hans G. Hoffmeister

ATTORNEY

United States Patent Office 3,243,123
Patented Mar. 29, 1966

3,243,123
SPRAYING APPARATUS
Donald M. Inghram and Thomas D. Hutton, Jr., Santa Clara, and Harold S. Olson, San Jose, Calif., assignors to FMC Corporation, San Jose, Calif., a corporation of Delaware
Filed Feb. 21, 1963, Ser. No. 260,112
11 Claims. (Cl. 239—124)

The present invention pertains to spraying apparatus, and more particularly relates to a mobile apparatus for applying liquid in sprays or jets to equipment such as aircraft, for cleaning or removing ice and snow therefrom.

Under severe winter flying conditions, ice and snow will sometimes accumulate on the control surfaces of aircraft in such amounts that it is beyond the capabilities of the de-icing boots and heaters of the aircraft to melt the frozen material. In such occurrences, the aircraft must be landed and serviced by auxiliary equipment to remove the frozen material. In other instances, grounded aircraft may not have hanger protection during winter and might thus require de-icing before being placed in service.

At the present time, auxiliary de-icing operations upon grounded aircraft are carried out by apparatus such as by tree spraying or fire fighting equipment that is relatively inefficient for this type of operation. In some cases, de-icing is accomplished with unheated solutions and is done at a stationary installation remote from the terminal building or from the flight line so that it is necessary to tow the aircraft to and from the de-icing apparatus.

The present invention comprises a self-powered vehicle in which a previously mixed water and glycol de-icing solution is heated, and from which the heated solution is sprayed upon the aircraft surfaces by an operator who is carried by a movable boom. After the driver places the vehicle in operating position, he sprays the lower surfaces of the aircraft by means of a hose which unreels from the vehicle and discharges the heated solution. The vehicle is adapted to spray two separate fluids, as for example, a detergent and clear rinse water, and accordingly, when the vehicle is not required for de-icing operations, it is useful for cleaning aircraft and associated equipment and facilities such as buildings, passenger ramps and so forth.

An object of the present invention is to provide an improved apparatus for removing ice and snow from aircraft.

Another object of this invention is to provide an efficient, mobile vehicle adapted for spraying liquids on selected objects.

Another object of the invention is to provide an aircraft service vehicle capable of discharging both heated and unheated fluids under pressure at various elevations above ground level.

Another object is to provide a multi-purpose aircraft service vehicle suitable for de-icing or washing aircraft, terminal buildings, ramps and the like, and which is suitable for various aircraft inspection and maintenance operations that have heretofore been carried out with mobile scaffolding and with ladders.

Another object is to provide an improved boom mechanism for a mobile spraying mechanism.

Another object is to provide a versatile liquid storage and pumping arrangement for spraying equipment.

Another object is to provide an efficient arrangement of tanks, pumps, boom members and the like on a vehicle.

Other objects and advantages of the present invention will become apparent from the following description and from the accompanying drawings, wherein:

FIGURE 1 is a schematic perspective showing the aircraft service vehicle of the present invention during an aircraft de-icing operation, the movable boom of the vehicle being partially extended and partially elevated from the vehicle.

FIGURE 2 is a schematic elevation of the right side of the vehicle with the boom retracted and lowered.

FIGURE 3 is a schematic elevation, partly broken away, of the left side of the vehicle.

FIGURE 4 is a schematic plan of the vehicle with part of its otherwise concealed structure indicated by dotted lines.

FIGURES 5 and 6 are schematic front and rear end elevations, respectively, of the vehicle of FIG. 1 and are drawn at a smaller scale than FIGURE 1.

FIGURE 7 is a fragmentary and schematic perspective illustrating the mounting and steering means for the single front wheel of the vehicle.

FIGURE 8 is a schematic horizontal section taken on line 8—8 of FIGURE 2, particularly illustrating the drive train for effecting telescoping movement of the boom.

FIGURE 9 is a vertical section taken on line 9—9 of FIGURE 8.

FIGURES 10 and 11 are transverse, schematic sections through the boom and are respectively taken on line 10—10 and on line 11—11 of FIGURE 8.

FIGURE 12 is a fragmentary, schematic perspective of the mechanism for paying out and retrieving the hose and electrical cable which extends through the movable boom, and is taken substantially on line 12—12 of FIGURE 2.

FIGURE 13 is a schematic elevation, partly broken away, taken looking in the direction of arrows 13—13 of FIGURE 12.

FIGURE 14 is a diagram illustrating the major components of the hydraulic system of the vehicle.

In general, the vehicle A (FIG. 1) comprises a mobile unit adapted to be maneuvered to and around a grounded aircraft B by a driver who controls the vehicle from a cab C. A telescopic boom D is pivotally connected to the rear portion of the vehicle for movement in a vertical plane, and the free end of the boom extends beyond the front end of the vehicle and is provided with a spray operator's cage E. Means for discharging a spray of heated fluid is provided in a compartment adjacent the front left corner of the vehicle, and also in the cage E, whereby both the driver, after leaving the cab C, and the spray operator can simultaneously direct the heated fluid onto the surfaces of the aircraft to remove accumulated snow and ice.

More specifically, the vehicle A (FIGS. 2–4) has a conventional frame which includes longitudinal rails 15 and 16 and transverse rails (not shown), to which are welded angle bar superstructures (not shown) that reinforce the frame and provide means for mounting various components of the vehicle. The vehicle A is provided with a tricycle-type wheel arrangement comprising dual left rear drive wheels 17, dual right rear drive wheels 18, and a single front steerable wheel 19 which is pivotable about the vertical axis 20 of a pivot shaft 21 (FIG. 7). The axis 20 is coincident with the longitudinal centerline of the vehicle and with the longitudinal centerline of the boom D so that the vehicle retains maximum stability regardless of the amount of extension or inclination of the boom D.

The pivot shaft 21 (FIG. 7) is rigidly connected to a fabricated wheel support 22 that carries a front wheel mounting axle 23. The wheel 19 on axle 23 may be moved through various turned positions by a ram 24 which is pivotally connected to the upper portion of the wheel support 22 and to a fixed part 26 of the frame of the vehicle. The ram is responsive to the rotation of a steering wheel 27 (FIG. 4) in the cab C.

The two pairs of rear drive wheels 17 and 18 (FIG. 4)

are mounted on a differential type axle 28 which is connected by a drive shaft 30 to a transmission 32, the input shaft of which is powered by a hydraulic motor 34. Each pair 17 and 18 of the drive wheels is arranged for independent braking by conventional brakes that are applied by a single pedal in the driver's cab C. Each of the two rear wheel brake lines is provided with a normally open, electrically operated valve (not shown) that may be closed by a switch in the cab. The switch is spring centered to a neutral position so that normally both rear wheels are braked when the pedal is depressed. If the driver holds the switch actuator in one of two possible other positions, one of the two brake valves will close so that the brake associated with that valve will not be energized when the pedal is depressed.

The single steerable wheel 19 can be pivoted right or left through more than 60 degrees from a straight ahead position by the ram 24, and the vehicle can, therefore, be turned in a small radius circle, or can be swung around while standing virtually still by applying the rear wheel brakes to only one pair of the drive wheels. This type of vehicle movement will be recognized as being particularly advantageous in changing the lateral position of the operator's cage E on the free end of the boom D since even a small sidewise movement of the vehicle results in a much larger sidewise movement of the cage, particularly when the boom is fully extended. The individual braking feature of the drive wheels is also useful in controlling steering movements of the vehicle when the ground is covered with ice because, even though the front wheels might tend to skid, braking only one pair of drive wheels tends to turn the vehicle and thus adds to the turning effect of the front wheel.

The hydraulic motor 34 (FIGURE 4), which powers the rear axle, is driven by the output of a hydraulic fluid pump 36 which is coupled to a gasoline engine 38, as is a hydraulic fluid pump 40 which powers the boom D, the steering ram 24, and two power operated valves, later described. The pumps 36 and 40 circulate fluid to and from a reservoir 42 which is located adjacent the rear left drive wheels 17.

The fluid which is sprayed on the various surfaces of the airplane is stored in several large tanks, which will be described presently, and is circulated by a pump 44 that is coupled to the engine 38 by a drive train 45 and is capable of pumping at a pressure as high as 400 p.s.i. The drive train includes a manually operated clutch (not shown) which is controlled by the driver in the cab C so that the pump 44 can be permitted to remain idle until a pumping operation is desired. The de-icing fluid is heated by a gasoline fired and thermostatically controlled heater 48 which is mounted in the rear left corner portion of the vehicle and is provided with a flue 50 which projects above the body of the vehicle. A door 51 (FIG. 3) is provided for access to the heater. Gasoline for both the engine 38 and the heater 48 is carried in a tank 52 mounted on the right side of the vehicle rearward of the engine 38 and accessible through an aperture 53 (FIG. 2) in the body of the vehicle.

Three tanks with a total capacity of 1000 gallons are provided in the vehicle A for storing the treating fluid. A large central tank 60 (FIG. 4) of 640 gallons capacity is cradled between the drive wheels 17 and 18 and is provided with a large filling passage that is covered by a filler cap 60A on the top of tank 60 (FIG. 1) of the vehicle. A tank 64 (FIG. 4) of 180 gallons capacity is mounted over the left rear drive wheels 17, and a tank 66 of the same capacity is mounted over the right rear drive wheels 18. The contents of the tanks 60, 64 and 66 are adapted to be heated by being circulated through the heater 48. Tanks 64 and 66 are each provided with a filler cap 64A and 66A respectively and are interconnected through conduits so that their contents may mix and be discharged in one stream.

It is possible, by means of the particular valves and piping arrangements for the storage tanks, to discharge the contents of the small tanks 64 and 66 separate from the contents of the large tank 60. Accordingly, when the vehicle is not being used for de-icing operations, the large tank 60 might be provided with a detergent solution and the small tanks with a rinse solution whereby the vehicle is useful for washing aircraft, terminal buildings, passenger ramps, and for other allied cleaning operations. In both washing and de-icing operations, the fluids are discharged through a hose 63 (FIG. 3) which is carried on a reel 65, and through a hose 67 (FIG. 2) which extends through the hollow boom D and into the operators cage E. A spray nozzle 69, having an integral, trigger operated valve, is provided for each discharge hose.

One end of the telescopic boom D (FIG. 4) is mounted upon a horizontal pivot shaft 68, the ends of which are rotatably mounted in bearings 70 that are bolted to certain fixed frame members of the vehicle. A pair (only one being shown in FIG. 2) of depending lugs 72 are secured to the boom and are pivotally connected to the piston rod of a hydraulic ram 73. The ram is pivoted to the frame of the vehicle and is effective to raise the boom upward through approximately 70 degrees from its lowermost, horizontal position.

The telescopic boom D (FIGS. 5–8) comprises a fabricated outer tube 74 of rectangular cross section in which an inner tube 76 is mounted by means of six rollers 77 that are mounted on the inner tube and engage inner surfaces of the outer tube and by six rollers 79 on the outer tube that ride over the outer surfaces of the inner tube. The tube 76 is adapted to be extended and retracted by a hydraulic motor 78 (FIG. 8) which has a driven shaft coupled to a gear reduction unit 80, said unit being provided with an output shaft 82 that extends into the tube 74 and has a sprocket 84 keyed thereon. A chain 86 is trained around sprocket 84 and around an idler sprocket 87 which is mounted near the forward end of the outer tube 74. One end of the chain 86 is adjustably anchored at 88 (FIG. 8) to the inner tube 76 and the other end of the chain is connected to a plate 90 that lies at one side of the boom D between the sidewalls of the inner and outer boom tubes. The plate 90 is roughly triangular and is aligned with a similar plate 92 which lies between the sidewalls of the tubes at the other side of the boom. Plates 90 and 92 are part of a safety mechanism for locking the tubes together in the event that the chain 86 should break while the boom is inclined, and are secured to a common pivot shaft 94.

The forward corner of plate 92 (FIG. 9) is connected to a tension spring 96 which is hooked on a bar 98 that is secured to the inner boom tube 76. Normally, the plates 90 and 92 are urged by the taut chain 86 against a fixed stop shaft 100 on the inner boom tube and, when the sprocket 84 is driven counterclockwise (FIG. 9), the lower flight of the chain 86 pulls the inner boom tube 76 out of its nested position within the tube 74. If the chain should break, the pivotally mounted plates 90 and 92 are then free to be swung by the spring 96 to a position in which a curved edge 102 of each plate engages a bottom wall 104 of the outer boom tube 74.

The curved edges 102 of the plates 90 and 92 are formed with a high friction surface, such as saw teeth, and are eccentric with respect to the pivot shaft 94 so that they will automatically cam into tighter engagement with the wall 104 and thus prevent collapse of the boom beyond the very small movement required to actuate the safety lock mechanism.

A block 106 (FIGS. 8 and 9) is secured to the inner boom tube 76 and is adapted to strike a block 108 which is bolted to one of the sidewalls of the outer boom tube, to limit extension of the boom D if certain electrical controls, which normally control such extension, should fail.

Forward movement of the tube 76 in the tube 74 is stopped by an electrical switch 110 (FIG. 8). The switch 110 is mounted on a bracket 112 that is secured to the free end of the outer tube 74 and has contacts adapted to be opened by a switch actuator 114 (FIGS. 8, 9 and 11) that is mounted on the side of the tube 76. By means of a conventional electrically actuated valve which controls flow of fluid to the boom motor 78 and will be described later, the switch 110 electrically isolates the valve, and its core is returned to a neutral position stopping the outward movement of the inner section of the boom.

When the tube 76 is telescoped into the tube 74 to near its full limit of movement, the contacts of a switch 116 (FIGS. 8 and 9) are opened by a switch actuator 118 that is mounted on the inner boom tube 76 near its outer end. Switch 116 when opened is effective to remove electric power from the previously mentioned electrically operated valve whereby the valve returns to its neutral position and deenergizes the hydraulic motor 78.

The outer end of the tube 76 is provided with a yoke for mounting the spray operators cage E. The yoke comprises a square tube 120 that has two spaced and forwardly projecting arms 122 each of which is provided with a socket to receive a pivot shaft 124 (FIGS. 2 and 4). The pivot shafts 124 are secured to the upper portion of the cage E, so that the cage is urged to an upright position by gravity. A hydraulic damper strut 126 interconnects one of the yoke arms 122 and the bottom portion of the cage E to prevent excessive swinging of the cage.

The cage E is entered through a door 128 (FIG. 2), and is provided with a heavy wire mesh floor 130 (FIG. 4). A resilient bumper comprising a tire casing 132 is bolted to the periphery of the undersurface of the floor 130 to protect the aircraft surfaces when the vehicle is in operation. Three lights 134 are mounted on the front of the cage for lighting the work area during night operations, or at other times as may be required.

The electrical connections to the lights 134 and to the various electrical controls that are mounted on the cage E are connected to conductors contained within a cable 136 (FIGS. 4, 8 and 9). The cable 136 extends through the boom D, and through a guide 138 mounted on the boom, and is trained around the lower groove in an idler pulley 140. The pulley 140 (FIG. 8) is mounted in an aperture provided in a side wall of the outer boom tube 74 near the boom pivot shaft 68. The discharge hose 67 also extends through the boom D, through the guide 138 and is trained around the upper groove in the pulley 140. Both the cable and the hose extend laterally from the pulley through a guide 142 which is secured to the boom D, and are wound in associated grooves in a take up drum 144 (FIGS. 12 and 13).

The depth of each groove in the drum 144 is sufficient to accommodate approximately 3 full turns of the hose or the cable. The axis of the drum 144 is inclined 35 degrees to the horizontal so that the axis is disposed in a plane midway between the extreme positions of the boom which, as previously mentioned, can be elevated from a horizontal position to a position inclined 70° to the horizontal. The lengths of the hose and of the cable carried on the drum correspond to the distance the boom is moved when it is moved from its innermost position to its fully extended position.

The inlet end 146 (FIG. 12) of the hose 67 extends through an aperture in the upper end wall of the drum 144, and is connected by rigid piping to a tubular shaft 148 that is rotatable in fixed brackets 149 and 150 (FIG. 13). The upper end 148a of the shaft 148 is plugged, and its other end is connected by means including a swivel coupling 152 (FIG. 13) to the pressure side of pump 44. This arrangement is thus the equivalent of a well known type of hose reel which permits paying out and retrieving the hose while it is permanently connected.

The electrical cable 136 (FIG. 13) passes through an aperture in the lower end wall of the drum 144 and is wound around a small diameter drum 154 that is secured to the larger drum. From the drum 154, the cable 136 passes under a pulley 156 and then extends to an anchor point near the central portion of the vehicle. From said anchor point the cable 136 extends to the several control stations of the vehicle and to a source of electrical power such as a battery. The pulley 156 is mounted in a yoke 158 that is urged downward by a tension spring 160 so as to maintain the cable 136 taut between the pulley 156 and the drum 154.

Both drums 144 and 154 are urged toward their fully wound positions by a plurality of tension springs 162, the lower ends of which are secured to the lower portion of a bracket 164 that depends from the frame of the vehicle. The upper ends of springs 162 are hooked on a strap 166, the upper edge of which is pinned to one end 168a of a chain 168. The chain 168 is wrapped around a sprocket 170 that is secured to the end of shaft 148 adjacent coupling 152, and around a sprocket 172 that is mounted on the bracket 164. The end 168b of the chain is pinned to the lower edge of the strap 166. When the hose and cable are payed out as the boom tube 76 is projected from the boom tube 74, the springs 162 are further tensioned so that the drum 144 will immediately turn in a winding direction to rewind the cable 136 and the hose 67 when the boom tube 76 is retracted. It will be noted that the small drum 154 and its associated pulley 156 and spring 160 eliminate the slip rings usually required in apparatus of this type.

The hydraulic drive motor 34 (FIGS. 4 and 14), which provides power to the transmission 32 and to the rear axle 28, is reversible and is controlled by a valve 180 which has a manual actuator 181 which the driver in the cab C may manipulate to cause the motor to be driven in either a forward or a reverse direction. When the actuator 181 has been moved to shift the core of valve 180 to a position wherein straight passages 180A communicate with the motor 34, the pump 36 draws fluid from reservoir 42 through conduit 179 and directs it to the motor through lines 179A to drive the motor in one direction of rotation. When the core has been shifted to align cross-passages 180B with the motor 34, the motor is driven in the opposite direction. Valve 180 is also provided with a detent device 182 to hold the valve in its selected position, and is of the type having integral pressure relief mechanism (not shown), so that when the vehicle wheels drive the motor 34 when the vehicle is coasting on acquired momentum, the hydraulic fluid is returned to the reservoir 42. A pipe 183 is adapted to bleed a selected portion of the fluid of the pressure discharge of the pump 36 back to the reservoir 42 through a pedal-operated valve 184 which is located in the cab C. Since the pump 36 is driven at a constant speed, the valve 184 provides means to vary the speed of the vehicle by regulating the speed of the motor 34.

The pressurized fluid discharged from the pump 40 is conducted by a pipe 185 to a flow divider 186 that discharges the larger volume of its flow through a pipe 187 to a flow divider 188. The remaining fluid from the flow divider 186 is conducted by a pipe 189 to a solenoid controlled valve 190. The valve 190 has a core that is arranged to be shifted in response to the energization of solenoids 192 and 193 which are arranged to be remotely operated by two sets of control buttons, one set being located on a control panel in the cage E and the other set on a panel at a station adjacent the hose reel 65. The valve is arranged to direct pressurized fluid to a double acting ram 191 which, as will be presently described, is effective to select fluid from only the large tank 60, or from both of the small tanks 64 and 66. The valve 190 has a pair of straight passages 190A and a pair of cross passages 190B which are arranged to direct the pressurized fluid in line 189 to opposite sides of the piston in the ram 191.

The valve 190 is connected in series with a valve 194 which is part of a power steering unit 195 which is actuated by the steering wheel 27 and may be of the type manufactured by the Saginaw Division of General Motors in Saginaw, Michigan, and designated as model No. 549–DV–130. The core of valve 194 is arranged to be shifted longitudinally in its housing and has straight passages 194A and cross passages 194B adapted to direct pressurized fluid to opposite sides of the piston in ram 24 which causes steering movement of the vehicle wheel 19.

The flow divider 188 directs pressurized fluid through lines 188A and 188B to two valves 197 and 198 respectively, valve 197 being effective to control the actuation of the hydraulic motor 78 that extends and retracts the boom, and valve 198 being arranged to control the actuation of the power cylinder 73 that raises and lowers the boom. The core of the valve 197 has straight-through passages 197A and cross-passages 197B and it is arranged to be shifted in its housing by two solenoids 199A and 199B, which are energized and de-energized by one set of push buttons on a control panel in the cab C and another set of buttons in the cage E. Conduits 200 and 201 are connected to the motor 78, there being a line throttle valve 203 in line 201. When the cross-passages 197B are connected to conduits 200 and 201, pressurized fluid in line 188A is directed into conduit 201, through a ball check in valve 203, and then to motor 78, causing the motor to rotate in a direction to extend the boom by moving the inner boom section 76 outwardly relative to the enclosing tubular section 74. When the straight passages 197A are connected to conduits 200 and 201, pressurized fluid in line 188A is directed into conduit 200 and then to the motor 78, causing the motor 78 to rotate in a direction to withdraw the inner section 76 into the enclosing housing thereby retracting the boom. It will be noted that a metering orifice 203A in throttle valve 203 controls the rate of flow of fluid through the motor 78 and, accordingly, it controls the speed at which the boom is retracted.

Similarly, the core of valve 198, which has straight-through passages 198A and cross-passages 198B, is arranged to be actuated by two solenoids 205 and 206 which are energized and de-energized by push buttons on the control panel in the cab C and in the cage E. Conduits 208 and 209 are connected to the boom-elevating power cylinder 73, there being a line throttle valve 210 in conduit 209 and a pilot-operated valve 212 in conduit 208. When the cross passages 198B are connected to conduits 208 and 209, pressurized fluid in line 188B is directed into conduit 209 and then to a conduit 211 leading to power cylinder 73 causing the boom to be elevated. When the straight through passages 198A are connected to conduits 208 and 209, pressurized fluid in line 188B is directed into conduit 208 and then to pilot valve 212 to unseat the ball-check 212A therein. Accordingly, the pressurized fluid in the power cylinder 73 is allowed to drain through conduit 211, valves 212 and 210, and a conduit 213 leading to reservoir 42, causing the boom to be lowered. It is to be noted that the metering orifice 210A in throttle valve 210 controls the rate of discharge of fluid from the power cylinder 73 so that the lowering of the boom is carried on at a controlled speed. Further, it will be noted that the only way the boom can be lowered is by applying pressure to valve 212 to unseat the ball check therein. Accordingly, if a conduit or fitting in the hydraulic system were to fail while the boom was in elevated position, the boom will not drop. This is, of course, a valuable safety mechanism for this type of apparatus.

The solenoid controlled valves 190, 197 and 198 are each spring centered so that their associated electrical control buttons must be held in depressed positions for the valves to maintain energization of their associated rams 191 and 73, and the boom motor 78.

The de-icing fluid circulated by the pump 44 through the storage tanks, the heater, and thence to the discharge spray guns 69, is capable of being routed through the selected storage tanks by means of the ram 191, the piston rod of which is connected by a link 191A to a slotted actuating arm 214A of a two-position valve 214 and to a slotted arm of a two-position valve 215. The link 191A may be removably secured to the arms 214A and 215A by bolts that extend through the link and through the slots in the arms. It will be evident, of course, that the slots in the arms permit rotary movement of the valves during straight line movement of the link. In the positions illustrated in FIGURE 14, the valves 214 and 215 are arranged to circulate fluid to and from only the large storage tank 60. An outlet pipe 216 of tank 60 communicates with a T-shaped passage 214B in valve 214 that leads to the suction line 218 of the pump 44. The discharge pipe 220 of the pump circulates the fluid to the heating coils of the heater 48, the outlet end of the coils being connected to a pipe 222 that transmits the fluid through a normally open manually-actuated valve 224, into the hose 63 on the reel 65, and thence to the spray gun 69. The pipe 222 has a branch pipe 226 which communicates through a normally open valve 227 with the boom hose 67–thus both spray guns 69 are simultaneously supplied with de-icing fluid.

When neither of the two spray guns 69 is operating, the fluid is circulated back to tank 60 through a relief valve 228 which is connected to the branch pipe 226 and to a pipe 230 which leads to a T-shaped passage 232 of the valve 215. A pipe 234, which in the present instance is aligned with one part of the valve passage 232, leads back into the tank 60.

When it is necessary to use the fluid in the small tanks 64 and 66, the ram 191 is energized to rotate the cores of the power actuated valves 214 and 215, the passages 214B and 232 of the valves are moved clockwise 90 degrees from their illustrated positions. Fluid will flow from tank 66 through a right angle passage in valve 214 and will be delivered to the suction side of pump P which will direct it to the heater 48 and then to the spray guns 69. If the valves of the spray guns are close, the fluid will pass through line 230, valve 215, and line 234 and be discharged into tank 64 which is interconnected with tank 66 by conduit 235.

A conduit 236 interconnects tanks 60 and 66, and a valve 237 in the conduit controls the flow therethrough. If the valve 237 is closed, the tank 60 is isolated; if the valve 237 is open, fluid may drain by gravity from tank 66 to tank 60.

During the energization of the ram 191 that operates the valves 214 and 215, there may be a period of time when the valves are being power-actuated during which the pressurized fluid in the pipe 230 is shut off from both tanks 60 and 64. In such an instance, the pressure is relieved by a pressure relief valve 238 that is in a line which bypasses the valves and directs the fluid into the tank 64.

The particular usefulness of circulating fluid through the two small tanks is that a more rapid heating of the fluid is possible because the total contents of the small tanks is approximately 350 gallons, while the tank 60 has a capacity of 650 gallons. If there is not time to heat the contents of all tanks before the vehicle is needed but more than 350 gallons is needed, the contents of the tank 60 may be heated and the small tanks can be used to automatically replenish the fluid drawn from the tank 60. To accomplish this, the power operated valves 214 and 215 remain in their illustrated positions and the valve 237 in pipe 236 between the tanks 60 and 66 is opened. Since the small tanks 64 and 66 are interconnected and are higher than the connection of the pipe 236 to the large tank 60, the contents of the small tanks will drain into the large tank 60 and replenish it automatically as the heated fluid is drawn from the tank 60.

Provision is made to circulate, heat and discharge the contents of all three tanks 60, 64 and 66, such as may be required in extensive de-icing operations needing the total 1000 gallon capacity of the vehicle. In order to position the power operated valves 214 and 215 to achieve total circulation of the de-icing fluid, the link 191A is removed from the power operated valves 214 and 215. The valve 214 is left in its illustrated position so as to draw fluid from the large tank 60. The valve 215 is manually rotated 90° clockwise from its illustrated position so that its passage 232 communicates via the pipe 240 with the small tank 64 at the rear left of the vehicle. The pipe 235 communicates tank 64 with tank 66, but since the pipe 242 of tank 66 cannot in this instance transmit fluid to the suction line 218 of the pump 44, the valve 237 between tank 66 and tank 60 must be opened to complete the circulatory path for the de-icing fluid. With this arrangement, fluid is drawn from tank 60, by pump 44 and is forced through the heater, then through valves 228 and 215, and finally through tank 64, conduit 235, tank 66 and conduit 236 back into tank 60.

When the vehicle A is being prepared for a typical de-icing operation, the tanks 60, 64 and 66 are filled with a pre-mixed solution of water and glycol which may be either preheated or unheated. The various valves controlling circulation of the fluid are then positioned in accordance with the foregoing description to circulate the de-icing fluid through only tanks 64 and 66, only tank 60, or through all three tanks. The gasoline engine 38 (FIG. 4) is then started and the driver in cab C engages the clutch to drive the fluid discharge pump 44.

Pump 44 circulates the de-icing fluid from the selected storage tanks through the coils of the heater 48, and as soon as the de-icing fluid has reached some preselected temperature indicated by a gauge in cab C (by an appropriate setting of the thermostat of the heater 48) the vehicle may carry out a de-icing operation. The driver maneuvers the vehicle to a position adjacent the airplane B (FIG. 1) and either the driver or the spray operator in the cage E extends and elevates the boom D to the desired working position. The driver dismounts from the vehicle and unreels the hose 63 from the reel 65 at the front left corner of the vehicle and directs a spray discharge of the heated de-icing fluid by means of the spray gun 69 against the lower surfaces of the aircraft, such as the landing gear. Meanwhile, the spray operator in the cage E directs the heated de-icing fluid against the adjacent surfaces of the aircraft at a preferred discharge distance of from five to fifteen feet. The discharge pressure of both spray guns is preset by an appropriate manipulation of the pressure relief valve 228 (FIG. 14) and is preferably about 225 p.s.i.

If, during positioning of the cage E while the driver is maneuvering the vehicle, the cage is appropriately positioned but is not visible to the driver, the operator in the cage may depress a button which lights a signal device in the cab C reading "STOP-HOLD," thereby signifying that the vehicle should be stopped in that position. It will be noted that the cage E (FIG. 1) can readily be repositioned outwardly along the wing of the aircraft by turning the front wheel of the vehicle for a left turn and then braking the rear left drive wheels and driving the rear right drive wheels in a reverse direction. Either the driver or the operator in cage E can then extend the boom D until the cage is centered over the wing.

As mentioned above, if the hydraulic controls are in the positions illustrated in FIGURE 14 and the valve 237 which interconnects the tanks 60 and 66 is closed, heated fluid will be drawn only from the tank 60. The tank 60 thus might be filled with a detergent for washing the aircraft or other associated structure, and the tanks 64 and 66 might contain a rinse solution of water. After the wash operation, the ram 191 can be actuated by either the driver at the reel 65 or by the operator in the cage E whereby the rinse solution will be drawn from the tanks 64 and 66 and discharged through the respective spray guns 69. If desired, the rinse solution in the tanks 64 and 66 might be heated prior to a washing operation if all three tanks are initially supplied with water and their contents are circulated through the heater, in the manner already described, after which the various valves can be placed in their former positions and the detergent can be added to the heated water in the large tank 60.

It is to be particularly noted that the mounting of the boom D along the centerline of the vehicle, pivoted at the rear of the vehicle and overhanging its front end, provides maximum stability even when the boom is fully extended and fully elevated. In conjunction with the single steerable wheel and the independent braking feature of the drive wheels, the boom arrangement thus enables rapid maneuvering of the operators cage E without requiring a turntable mounting of the lower end of the boom to the vehicle, and without requiring automotive type front wheels and wheel suspension.

While a particular embodiment of the present invention has been shown and described, it will be understood that the particular details herein set forth are capable of modification and variation without departing from the principles of the invention and that the scope of the invention should be limited only by the scope and proper interpretation of the claims appended hereto.

The invention having thus been described, that which is believed to be new and for which protection by Letters Patent is desired is:

1. A mobile sprayer comprising a mobile frame, storage means on said frame for containing treating liquid in three separate compartments comprising first, second and third storage tanks, a conduit communicating the interior of said second tank with the interior of said third tank, a heater for liquids mounted on said frame, pumping means for pressurizing the treating liquid, means including a first valve operable in a first position to direct liquid from said first tank through said pump to said heater and operable in a second position to direct liquid from said third tank to said heater, discharge conduit means connected to the outlet of said heater, means including a second valve operable in a first position to route liquid from said discharge conduit to said first tank and in a second position to route liquid from said discharge conduit to said second tank, removable link means interconnecting the actuators of said first and second valves for simutaneous operation, and a conduit interconnecting said first and third tanks, whereby when said valves are in interconnecting relation and are in said first positions, liquid is removed from said first tank, directed through said heater and returned to said first tank, and when said valves are interconnected and are in said second positions, liquid is drawn from said third tank, directed through said heater and said second tank and returned to said third tank, and whereby when said interconnecting link mean is is removed and said first valve is in said first position and said second valve is in said second position, liquid will be removed from said first tank, directed through said heater, and directed successively through said second tank and said third tank and returned to said first tank.

2. A mobile sprayer comprising a self-powered frame structure, a tricycle type wheel suspension for said frame, said wheel suspension comprising at least two drive wheels on a common axis and a single steerable wheel, means for independently braking said drive wheels, an upwardly inclined boom mounted longitudinally along said frame in a position overlying said steerable wheel and extending beyond the limits of said frame adjacent said steerable wheel, storage means on said frame for containing a bulk supply of treating liquid, and means for discharging the liquid under pressure from the free end of said boom.

3. A mobile sprayer comprising a self-powered frame, a single steerable wheel supporting the front end of said frame, drive wheels supporting the opposite end of said frame, means for independently braking said drive wheels, a cab mounted on said frame intermediate said front and rear wheels at one side of the longitudinal centerline of the vehicle, storage means on said frame for containing a bulk supply of treating liquid, a telescopic boom pivotally connected to said frame adjacent said drive wheels and extending forwardly over said steerable wheel and mounted for pivotal movement in a vertical plane, power means controllable from said cab for effecting pivotal movement of said boom, power means for telescoping said boom, conduit means for said liquid terminating adjacent the free end of said boom, a spray nozzle receiving liquid from said conduit means, and pumping means for circulating said liquid through said conduit means for discharging the liquid from said nozzle at the free end of said boom.

4. A mobile spraying apparatus comprising a self-powered and wheel-supported frame, storage means on said frame for containing treating liquid, a hollow erectable telescoping boom pivoted at one end to said frame and having a free end remote therefrom, means for erecting said boom, means for telescoping said boom, a discharge nozzle carried by the free end of the boom and capable of being aimed independently of the attitude of said boom, a shaft mounted for rotation about a longitudinal axis on said frame, a first take-up drum mounted on said shaft, flexible liquid conduit means connecting said nozzle and said storage means for fluid communication by extending along the length of said boom and being wound around said first take-up drum so that said drum turns and pays out the conduit as the boom extends, and winds up the conduit as the boom retracts, remotely controllable valve means for controlling the flow of said liquid through said conduit, a plurality of electrically operated means on the frame for actuating said boom erecting means, said boom telescoping means and said valve means, a plurality of electrical control means supported by the boom at its free end for controlling said electrically operated means, a second take-up drum mounted on said shaft for turning with the first drum and being of substantially smaller diameter than said first drum, anchor means mounted on said frame, a rotatable pulley having its axle resiliently attached to said frame, an electric cable connecting said control means to said actuating means by extending along the boom from its free end around said first take-up drum, then around said second drum and around said pulley and secured to said anchor means, and means for causing said drums to wind up said electric cable and said liquid conduit as the boom is retracted.

5. A self-powered apparatus for spraying airplanes comprising a frame, a single steerable ground wheel supporting the frame at one end thereof, laterally spaced drive wheels supporting the frame at the other end, means on said apparatus providing a control station, means for steering said steerable wheel from said control station, means for driving said drive wheels to propel said apparatus, means to control said drive means from said control station, means for selectively retarding the speed of either drive wheel relative to the other drive wheel, means for operating said retarding means from said control station, a boom having one end mounted on said frame for pivoting in a vertical plane, a personnel carrier at the other end of said boom, means for moving said boom about its pivot axis, means for controlling said boom moving means operable from said control station and from said personnel carrier, tank means on said frame for storing spray liquid, heater means on said frame for heating the spray liquid, recirculating means connected to said tank means and to said heater means for causing spray liquid to flow from said tank means through said heater means and back to said tank means during idle periods, means for removing liquid from said tank means and spraying it from said personnel carrier onto an airplane and means controllable from said control station and from said personnel carrier for selectively operating either said recirculating means or said removal and spray means.

6. The apparatus of claim 5 wherein the boom is telescoping and is provided with means for extending the boom, and means for controlling said boom extending means from the control station and from the personnel carrier.

7. The apparatus of claim 5 wherein the means for retarding speed of the drive wheel comprises braking means operable from the control station to brake either drive wheel independently of the other drive wheel.

8. The apparatus of claim 5 including an auxiliary spray means connected to said heater means and located for manipulation by a man on the ground.

9. The apparatus of claim 5 wherein said drive means for the drive wheels comprises a rear axle differential gear assembly, a gear reduction unit for driving said assembly, a hydraulic motor for driving said reduction unit, a hydraulic pump for driving said motor, a reservoir for supplying said pump with hydraulic liquid and an internal combustion engine for driving said pump.

10. The apparatus of claim 5 wherein said tank means comprises a main tank, at least one auxiliary tank and valve means for selectively removing liquid from one of said tanks at a time, and wherein said recirculating means includes valve means for causing spray liquid to circulate through said heater means and both of said tanks.

11. The apparatus of claim 5 wherein said tank means comprises a main tank and at least one auxiliary tank, and the said recirculating means comprises a liquid pump discharging to said heater means and having at its inlet a first two-position valve operable to select between said main tank and said auxiliary tank, a relief valve, a discharge conduit connecting the outlet of said heater means to said relief valve, a second two-position valve operable to receive liquid from the discharge of said relief valve and and to route the liquid to said main tank when in one position and to route the liquid to said auxiliary tank when in the other position, a gravity flow valve operable to drain said auxiliary tank into said main tank, and means to cause said first two-position valve to connect said main tank to the inlet of said pump and to cause said second two-position valve to connect the discharge of said relief valve to said auxiliary tank.

References Cited by the Examiner

UNITED STATES PATENTS

| | | | |
|---|---|---|---|
| 1,835,132 | 12/1931 | Anania | 239—165 |
| 2,315,085 | 3/1943 | Churchward | 239—197 |
| 2,597,719 | 5/1952 | Foster | 239—130 |
| 2,604,854 | 7/1952 | Taylor | 239—127 |
| 2,857,005 | 10/1958 | Medlock | 239—197 |
| 2,963,227 | 12/1960 | Lambert | 239—197 |
| 2,987,259 | 6/1961 | Lindquist | 239—130 |
| 3,010,533 | 11/1961 | Ross | 182—2 |
| 3,037,707 | 6/1962 | Ligon | 239—127 |
| 3,064,754 | 11/1962 | Broderson et al. | 182—2 |
| 3,074,649 | 1/1963 | Atkinson | 239—165 |
| 3,086,713 | 4/1963 | Moldenhauer | 239—130 |

EVERETT W. KIRBY, *Primary Examiner.*